July 9, 1968     R. L. BUTTLE     3,391,446
ALUMINUM BRAZING
Filed Aug. 30, 1965
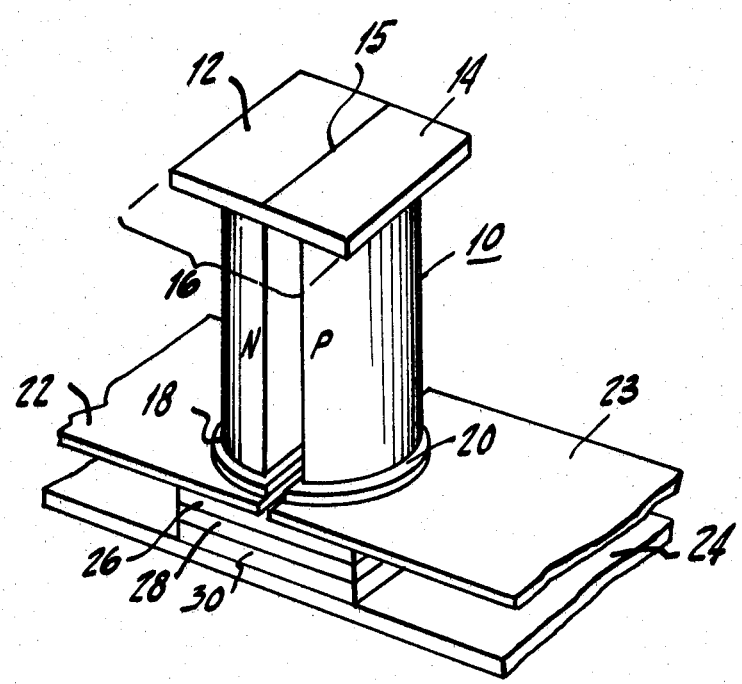
INVENTOR.
ROBERT L. BUTTLE
BY
Attorney United States Patent Office 3,391,446
Patented July 9, 1968

3,391,446
ALUMINUM BRAZING
Robert L. Buttle, Summit, N.J., assignor, by mesne assignments, to the United States of America as represented by the United States Atomic Energy Commission
Filed Aug. 30, 1965, Ser. No. 483,731
12 Claims. (Cl. 29—471.9)

This invention relates to bonding, and particularly to the bonding of aluminum to metals such as molybdenum, niobium, iron, and tungsten. The invention has particular utility in thermoelectric devices.

Various methods are known for bonding aluminum to metals. In general, however, while the bonds provided by these methods are more or less satisfactory at low temperatures, these bonds are mechanically weak and tend to deteriorate with time when exposed to temperatures in excess of 250° C.

An object of this invention is to provide a novel and improved method for bonding aluminum to metals.

A further object of this invention is to provide a simple and efficient method of providing a metallurgical bond between aluminum and a metal, said bond being stable at elevated temperatures, being mechanically strong, and having a high thermal conductivity and a high electrical conductivity.

Another object of this invention is to provide a novel and improved method for fabricating a thermoelectric device.

For achieving these objects, the surface of the metal which is to be bonded to an aluminum body is coated with a film of rhodium. The aluminum body is then brazed to the rhodium coated surface using known aluminum brazing processes.

The drawing shows, in perspective, a thermoelectric device.

The thermoelectric device or generator 10 shown in the drawing comprises N type and P type semiconductor thermoelements N and P, respectively, each of the elements comprising, for example, a silicon-germanium alloy. These elements may be either poly-crystalline or monocrystalline. The thermoelement P is heavily doped with an electron acceptor element such as boron, aluminum, or gallium from Group IIIa of the Chemical Periodic Table, and the thermoelement N is heavily doped with an electron donor element such as phosphorous or arsenic from group Va of the Chemical Periodic Table.

A shoe 12 of N type silicon alloy is joined to what is to become the hot end of the thermoelement N. A shoe 14 of P type silicon alloy is joined to the hot end of the thermoelement P. The shoes 12 and 14 may be rectangualr blocks substantially the same size and having abutting faces 15 each with an area at least as great as the cross-sectional area of each thermoelement taken perpendicularly to the longitudinal axis thereof. The abutting faces 15 of the shoes 12 and 14 are bonded to one another. The exposed surfaces of the shoes 12 and 14 are of sufficient size to receive an adequate quantity of heat from a heat source, not shown, for the efficient operation of the thermoelectric generator 10.

The silicon alloy shoes 12 and 14 may be bonded to each other and to the thermoelements N and P by means of hot pressed diffusion bonds. The bonds are non-rectifying and of low electrical resistance. The bond between the shoes 12 and 14 may be obtained by first applying a layer of material such as chromium, cobalt, iron, manganese, nickel, niobium, rhenium, rhodium, tantalum, titanium, ziconium, tungsten, or molybdenum between the shoes 12 and 14. A diffusion bond is formed by heating the shoes while the shoes are pressed together. The temperature to which the shoes are heated should be at least about 85% of the melting point, but below the melting point, of any of the shoe materials or eutectics that may be formed between the contacting materials. For example, where the intermediate metallic layer is of chromium or titanium, the temperature at which the bonding process is carried out is between 1050° C. and 1200° C., and the pressure may be between about 200 and 500 p.s.i. This operation is preferably carried out in a vacuum or in a neutral ambient, such as argon, for example. The aforementioned heat and pressure may be applied for a period ranging from one half minute to one hour until a solid diffusion between the metal intermediate layer and the abutting shoes has taken place.

The bond between each shoe 12 and 14 and its respective thermoelement N or P may be obtained in the same manner but without the use of an intermediate metal layer and with pressures in the order of 5–10 p.s.i.

After the shoes 12 and 14 are bonded to each other and to the thermoelements N and P, the shoes comprise a hot strap 16.

A pair of metal shoes 18 and 20, preferably of tungsten, are fixed to what is to become the cold ends of the thermoelements N and P. Any suitable known bonding technique may be used, such as brazing the tungsten shoes to the cold ends of the thermoelements with copper or a noble metal or an alloy of noble metals. Alternately, the tungsten shoes may be diffusion bonded to the thermoelements N and P by the application of heat and pressure in the same manner and at the same time the shoes 12 and 14 are bonded to the thermoelements. Tungsten is preferably used because its coefficient of thermal expansion is relatively closely matched to the coefficient of thermal expansion of the Si–Ge alloy thermoelements N and P.

Bonded to the tungsten shoes 18 and 20 are electrical connectors 22, 23, respectively. Connectors 22 and 23 are used for electrically connecting the generator 10 into an electrical circuit, not shown. Connectors 22 and 23 are preferably of aluminum owing to the high electrical conductivity and the light weight of aluminum.

In the operation of generator 10, hot strap 16 is heated by a heat source, not shown. Shoes 18 and 20 are maintained at a temperature less than the temperature of strap 16, and a Seeback voltage is thus induced between connectors 22 and 23. The output voltage of generator 10 is a function of the difference in temperature between hot strap 16 and shoes 18 and 20. The higher the temperature difference, the higher is the voltage output.

For increasing the voltage output of generator 10, means are provided for decreasing the temperature of shoes 18 and 20. One such means comprises mounting the shoes 18 and 20 on a heat sink or radiator 24. Aluminum is a preferred material for heat sink 24 owing to its high thermal conductivity and light weight. To prevent electrical shorting of the connectors 22 and 23 to the heat sink 24, an insulator plate 26 made from a relatively high thermal conductivity insulating material, such as an alumina ceramic, is disposed between the connectors 22, 23 and the heat sink 24. To compensate for the differences in the coefficients of thermal expansion of the various materials and to balance thermally induced stresses therebetween, an aluminum compensator plate 28 and a tungsten compensator plate 30 are disposed between the insulator plate 26 and the heat sink 24.

For bonding the ceramic plate 26 to connectors 22 and 23 and to compensator plate 28, the upper and lower faces of plate 26 are molybdenum metalized. Metalizing of ceramics is well known, hence is not described herein. Insulator plate 26 can be brazed to connectors 22 and 23 and to compensator plate 28 by means of a brazing material comprising, e.g., by weight, 86% aluminum, 10% silicon, and 4% copper, commercially available as "Alcoa" 716 braze.

The various tungsten members, that is, shoes 18 and 20, and compensator plate 30, are bonded to their respective aluminum members, that is, connectors 22 and 23, radiator 24, and compensator plate 28, as follows: The surface of the tungsten body which is to be bonded to an aluminum member is first coated, as by any known method such as electroplating or vapor deposition, with a film of rhodium. Preferably, a thin film fully covering the tungsten area to be brazed is used.

By way of specific example, the tungsten area to be brazed is rhodium plated in a low stress, rhodium phosphate solution, such as a solution known as "Rhodex," commercially available from Sel Rex Corporation. The plating process is carried out at 45–50° C. for 3½ to 6½ minutes, using a plating current of 8 to 16 amps per square foot of tungsten area. A coating of rhodium in the order of $3 \times 10^{-5}$ inch thick is plated on the tungsten. If longer plating times are used, thicker coatings result. This is not preferred, however, since thicker coatings of rhodium do not adhere well to tungsten. Further, it is found that, generally, stronger bonds between aluminum and the rhodium coated metals occur when the rhodium coating is thin, e.g., in the order of $3 \times 10^{-5}$ inch thick.

The rhodium coated tungsten surface is then brazed to the aluminum member using known aluminum brazing techniques. For example, an aluminum base brazing material member may be placed between the rhodium coated tungsten surface and the aluminum member. A brazing material alloy that has produced satisfactory results comprises, by weight, essentially 88% aluminum and 12% silicon, and is commercially available at "Alcoa" 718 braze. Another satisfactory braze material is the aforementioned "Alcoa" 716 braze.

Prior to the actual bonding process, the aluminum surface to be bonded and the braze material are preferably chemically cleaned by known means. For example, these members may be dipped into a caustic soda solution, then rinsed in water, then dipped into a 50% nitric solution, and then rinsed again in water.

After disposing the brazing material body between the surfaces of the aluminum and tungsten bodies to be bonded, the several members are placed in a suitable jig, not shown, for maintaining the parts in contact during the bonding process. Suitable jigs and clamps are well known, their selection being dependent upon the configuration of the parts being bonded. Very little pressure is required, the purpose of the pressure being to maintain the bodies in contact and to avoid shifting of the bodies relative to one another during the bonding process.

The assembled bodies are then heated in a non-oxidizing ambient such as in vacuum, hydrogen, a molten salt bath, or the like. With the aforementioned aluminum-silicon braze materials, the process is carried out, for example, at a temperature between 577–620° C. for 2–40 minutes.

The actual bonding mechanism is not fully understood. It appears that the rhodium acts as a catalyst or flux and promotes wetting of the tungsten by the braze material. Attempts to bond aluminum to tungsten in the past using various braze alloys have been relatively unsuccessful due to the poor wetting of tungsten by the brazing alloy. Conversely, with the presently described process, it is found that rhodium clad tungsten surfaces are so wettable by the braze material that extensive spreading of the molten braze over the clad surfaces occurs during the brazing process.

Bonds made by the above described process have been aged for 1250 hours in air at 325° C. with no deterioration in the bond. Half inch diameter test samples have been made with strengths up to 6000 p.s.i.

In some instances, it is desirable to provide a thin coating, in the order of $3 \times 10^{-5}$ inch thick, of rhodium on the molybdenum metalized faces of the ceramic insulator plate 26. Known coating methods, such as the ones described, may be used. Upon brazing, using the same brazes and process described above in connection with the bonding of tungsten to aluminum, a mechanically strong, metallurgical bond between the molybdenum metalized faces of the plate 26 and aluminum members 22, 23, and 28 takes place.

Other metals such as niobium and iron, for example, can be bonded to aluminum in the manner described above. When electroplating iron with rhodium, however, it is preferable to precoat the iron with a flash of nickel. This prevents undesirable reaction between the iron and the plating solution.

What is claimed is:
1. A method of bonding a body having an aluminum surface to a body having a surface of iron, niobium, tungsten, or molybdenum metal, said method comprising:
   coating said metal surface with rhodium,
   disposing an aluminum base brazing material in contact with and between said rhodium coated surface and said aluminum surface, and
   maintaining said surfaces and material in contacting relation while heating said bodies and material in a non-oxidizing ambient for melting said brazing material.

2. A method of bonding a body having an aluminum surface to a body having a surface of tungsten or molybdenum metal, said method comprising:
   coating said metal surface with rhodium,
   disposing an aluminum base brazing material in contact with and between said rhodium coated surface and said aluminum surface, and
   maintaining said surfaces and material in contacting relation while heating said bodies and material in a non-oxidizing ambient for melting said brazing material.

3. A method of bonding a body having an aluminum surface to a body having a surface of niobium comprising:
   coating said niobium surface with rhodium,
   disposing an aluminum base brazing material containing silicon in contact with and between said rhodium coated surface and said aluminum surface, and
   maintaining said surfaces and material in contacting relation while heating said bodies and material in a non-oxidizing ambient for melting said brazing material.

4. A method of bonding a body having an aluminum surface to a body having a surface of tungsten comprising:
   coating said tungsten surface with rhodium,
   disposing an aluminum base brazing material containing silicon in contact with and between said rhodium coated surface and said aluminum surface, and
   maintaining said surfaces and material in contacting relation while heating said bodies and material in a non-oxidizing ambient for melting said brazing material.

5. A method of bonding a body having an aluminum surface to a body having a surface of molybdenum comprising:
   coating said molybdenum surface with rhodium,
   disposing an aluminum base brazing material containing silicon in contact with and between said rhodium coated surface and said aluminum surface, and
   maintaining said surfaces and material in contacting relation while heating said bodies and material in a non-oxidizing ambient for melting said brazing material.

6. A method of bonding a body having an aluminum surface to a body having a surface of iron comprising:
   coating said iron surface with rhodium,
   disposing an aluminum base brazing material containing silicon in contact with and between said rhodium coated surface and said aluminum surface, and maintaining said surfaces and material in contacting relation while heating said bodies and material in a non-oxidizing ambient for melting said brazing material.

7. The method of bonding a body having an aluminum surface to a body having a surface of tungsten comprising,
   coating said tungsten surface with a rhodium film about $3 \times 10^{-5}$ inch thick,
   disposing an aluminum base body of brazing material containing silicon in contact with and between said rhodium-coated surface and said aluminum surface, and
   maintaining said bodies in contacting relation while heating said bodies in a non-oxidizing ambient to a temperature between 577 and 620° C. for two to forty minutes.

8. The method of bonding a body having an aluminum surface to a body having a surface of molybdenum comprising:
   coating said molybdenum surface with a rhodium film about $3 \times 10^{-5}$ inch thick,
   disposing an aluminum base body of brazing material containing silicon in contact with and between said rhodium coated surface and said aluminum surface, and
   maintaining said bodies in contacting relation while heating said bodies in a non-oxidizing ambient to a temperature between 577 and 620° C. for two to forty minutes.

9. The method of bonding an aluminum body to a body of tungsten comprising:
   coating a surface of said tungsten with a film of rhodium in the order of $3 \times 10^{-5}$ inch thick,
   chemically cleaning a surface of said aluminum body and surfaces of an aluminum base brazing material body containing silicon,
   disposing said brazing material body in contact with and between said rhodium coated surface and said chemically cleaned surface of said aluminum body, and
   maintaining said bodies in contacting relation while heating said bodies in a non-oxidizing ambient to a temperature between 580 and 620° C. for five to forty minutes.

10. The method of bonding an aluminum body to a body having a surface of niobium, tungsten, iron, or molybdenum metal, said method comprising:
    coating said metal surface with a film of rhodium in the order of $3 \times 10^{-5}$ inch thick,
    chemically cleaning a surface of said aluminum body and surfaces of an aluminum base brazing material body containing silicon,
    disposing said brazing material body in contact with and between said rhodium-coated surface and said chemically cleaned surface of said aluminum body, and
    maintaining said bodies in contacting relation while heating said bodies in a non-oxidizing ambient to a temperature between 577 and 620° C. for two to forty minutes.

11. The method of fabricating a thermoelectric generator including stacked ceramic, aluminum, and tungsten members comprising:
    molybdenum metalizing a surface of said ceramic member,
    coating a surface of said tungsten member with rhodium,
    disposing an aluminum base brazing material in contact with and between said rhodium-coated surface and said aluminum member and between said molybdenum-metalized surface and said aluminum member, and
    maintaining said bodies and material in contacting relation while heating said members and material in a non-oxidizing ambient to melt said brazing material.

12. The method of fabricating a thermoelectric generator including stacked ceramic, aluminum, and tungsten members comprising:
    metalizing a surface of said ceramic member with molybdenum,
    coating said metalized surface of said ceramic and a surface of said tungsten member with rhodium,
    disposing an aluminum base brazing material containing silicon in contact with and between each rhodium coated surface and said aluminum member, and
    maintaining said members and material in contacting relation while heating said bodies and material in a non-oxidizing ambient for melting said brazing material.

References Cited

UNITED STATES PATENTS

| | | | |
|---|---|---|---|
| 2,719,797 | 10/1955 | Rosenblatt | 29—504 X |
| 3,044,156 | 7/1962 | Whitfield | 29—196.2 X |
| 3,107,422 | 10/1963 | Eckermann | 29—502 X |
| 3,132,928 | 5/1964 | Crooks | 29—504 X |
| 3,276,113 | 10/1966 | Metcalfe | 29—504 X |
| 3,312,539 | 4/1967 | Marshall | 29—504 X |

JOHN F. CAMPBELL, *Primary Examiner.*

R. F. DROPKIN, *Assistant Examiner.*